(12) United States Patent
Hayashi et al.

(10) Patent No.: US 11,137,951 B2
(45) Date of Patent: Oct. 5, 2021

(54) IMAGE FORMING APPARATUS, CONTROL METHOD OF IMAGE FORMING APPARATUS, AND PROGRAM

(71) Applicant: CANON KABUSHIKI KAISHA, Tokyo (JP)

(72) Inventors: Tomonori Hayashi, Nagareyama (JP); Kenji Saiki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/428,818

(22) Filed: May 31, 2019

(65) Prior Publication Data
US 2019/0377519 A1    Dec. 12, 2019

(30) Foreign Application Priority Data
Jun. 7, 2018   (JP) ............................. JP2018-109866

(51) Int. Cl.
  *G06F 3/12* (2006.01)
  *G11B 19/04* (2006.01)
  *G06F 3/06* (2006.01)

(52) U.S. Cl.
  CPC ............ *G06F 3/121* (2013.01); *G06F 3/0614* (2013.01); *G06F 3/126* (2013.01); *G06F 3/1274* (2013.01); *G11B 19/04* (2013.01)

(58) Field of Classification Search
  CPC ........ G06F 3/121; G06F 3/0614; G06F 3/126; G06F 3/1274; G11B 19/04
  USPC .................. 358/1.16, 1.15, 1.9, 501
  See application file for complete search history.

(56) References Cited

U.S. PATENT DOCUMENTS

2006/0044611 A1*  3/2006  Aoki ............... H04N 1/00424
                                                        358/1.15
2009/0002744 A1*  1/2009  Shimada .......... H04N 1/00877
                                                        358/1.15

FOREIGN PATENT DOCUMENTS

| JP | H03-027429 A  | 2/1991 |
| JP | H10-013593 A  | 1/1998 |
| JP | 2004-032048 A | 1/2004 |
| JP | 2004-128665 A | 4/2004 |
| JP | 2004-140485 A | 5/2004 |
| JP | 2010-098403 A | 4/2010 |

* cited by examiner

*Primary Examiner* — Quang N Vo
(74) *Attorney, Agent, or Firm* — Canon U.S.A., Inc. IP Division (57) ABSTRACT

When a plurality of units of the same data is stored for all jobs, the capacity of a hard disk may be greatly consumed. The present disclosure relates to a storage that stores data based on a job, and a controller configured to cause the storage to store the data and not to store data identical to the data, based on a job type of the job being a first type, and cause the storage to store the data and the data identical to the data, based on the job type of the job being a second type different from the first type.

17 Claims, 12 Drawing Sheets

| No. | PRINT JOB DATA | JOB TYPE |
|---|---|---|
| 001 | JOB A | FAX |
| 002 | JOB B | PDL |
| 003 | JOB C | BOX |
| 004 | JOB D | COPY |

| JOB TYPE | BACKUP |
|---|---|
| PDL | TO BE STORED |
| COPY | TO BE STORED |
| BOX | NOT TO BE STORED |
| FAX | NOT TO BE STORED |

FIG. 8B

| JOB TYPE | BACKUP |
|---|---|
| PDL | NOT TO BE STORED |
| COPY | NOT TO BE STORED |
| BOX | TO BE STORED |
| FAX | TO BE STORED |

ERROR HAS OCCURRED DURING DATA PROCESSING.

DATE & TIME: ○○ MONTH, ○○ DATE, ○○ HOUR, ○○ MINUTE
JOB NAME: □□□□
USER NAME: ×××

FIG. 10B

ERROR HAS OCCURRED DURING DATA PROCESSING.
RE-INPUT TARGET PRINT JOB.

DATE & TIME: ○○ MONTH, ○○ DATE, ○○ HOUR, ○○ MINUTE
JOB NAME: □□□□
USER NAME: ×××

IMAGE DATA MANAGEMENT TABLE (1000)

| STORED JOB (1001) | CONFIRMED STATUS (1002) | IMAGE DATA (1003) |
|---|---|---|
| STORED JOB 1 | UNCONFIRMED | IMAGE DATA 1<br>IMAGE DATA 1 (BACKUP) |
| STORED JOB 2 | UNCONFIRMED | IMAGE DATA 2<br>IMAGE DATA 2 (BACKUP)<br>IMAGE DATA 3<br>IMAGE DATA 3 (BACKUP) |
| STORED JOB 3 | CONFIRMED (OK) | IMAGE DATA 4 |
| STORED JOB 4 | CONFIRMED (NG) | — |

FIG. 14

USE OF STORED FILE

SELECT FILE AND SPECIFY USE PURPOSE.

BOX / 00:

| ✓ | TYPE | NAME | PAPER SIZE | PAGE | DATE / TIME ▲ |
|---|------|------|------------|------|---------------|
| ☑ |   | 1 | A4 | 1 | 05/02 13:58 |
| ☐ |   | 2 | A4 | 1 | 05/02 13:58 |

1201

1203

↑ UPWARD    ⟳ UPDATE

TOTAL: 2    NUMBER OF SELECTED ITEMS: 1

DESELECT

DETAILS ▲    VIEW IMAGE    EDIT FILE    PRINT LIST    PRINT

1202

1200

- MAIN MENU
- CUSTOM MENU
- PERSONAL SETTINGS
- ADDRESS/TRANSFER SETTINGS
- STATUS CONFIRMATION/CANCEL

IMAGE FORMING APPARATUS, CONTROL METHOD OF IMAGE FORMING APPARATUS, AND PROGRAM

BACKGROUND

Field of the Disclosure

The present disclosure relates to an image forming apparatus, a control method of an image forming apparatus, and a program.

Description of the Related Art

Conventionally, some image forming apparatuses (MFPs) have included a hard disk as a storage device for holding user's image data and application data, and temporary data in process.

In a hard disk, there may occur a medium defective area (defective sector) where data writing and reading cannot be normally performed. The cause of the defective sector is, for example, shutting off the main power (for example, a power failure or the like) or a physical impact during operation of the hard disk.

At the reading of data, when the data storage destination includes a defective sector, the data stored in the defective sector cannot be read normally, resulting in a data read error.

Japanese Patent Laid-Open No. 3-27429 proposes, as a technique for suppressing the occurrence of a read error when reading data from a hard disk, an information processing apparatus that stores a plurality of units of the same data in the hard disk.

Japanese Patent Laid-Open No. 10-13593 proposes, as a technology for coping with a read error at the reading of data from a hard disk, an image forming apparatus that instructs the user to re-input image data, thereby to continue a copying operation.

Also in the hard disk included in the image forming apparatus, the occurrence of a read error of the hard disk can be suppressed by storing a plurality of units of the same data.

However, if a plurality of units of the same data is stored for all jobs, the capacity of the hard disk may be greatly consumed.

SUMMARY

The present disclosure relates to a storage that stores data based on a job, and a controller configured to cause the storage to store the data and not to store data identical to the data, based on a job type of the job being a first type, and cause the storage to store the data and the data identical to the data, based on the job type of the job being a second type different from the first type.

Further features of the present disclosure will become apparent from the following description of exemplary embodiments (with reference to the attached drawings).

DESCRIPTION OF THE EMBODIMENTS

Exemplary embodiments of the present disclosure will be described below in detail with reference to the accompanying drawings, The following exemplary embodiments are not intended to limit the present disclosure. In addition, in some embodiments, all the combinations of features described in relation to the exemplary embodiments are not necessarily deemed to be essential.

Example 1

Figure 1:
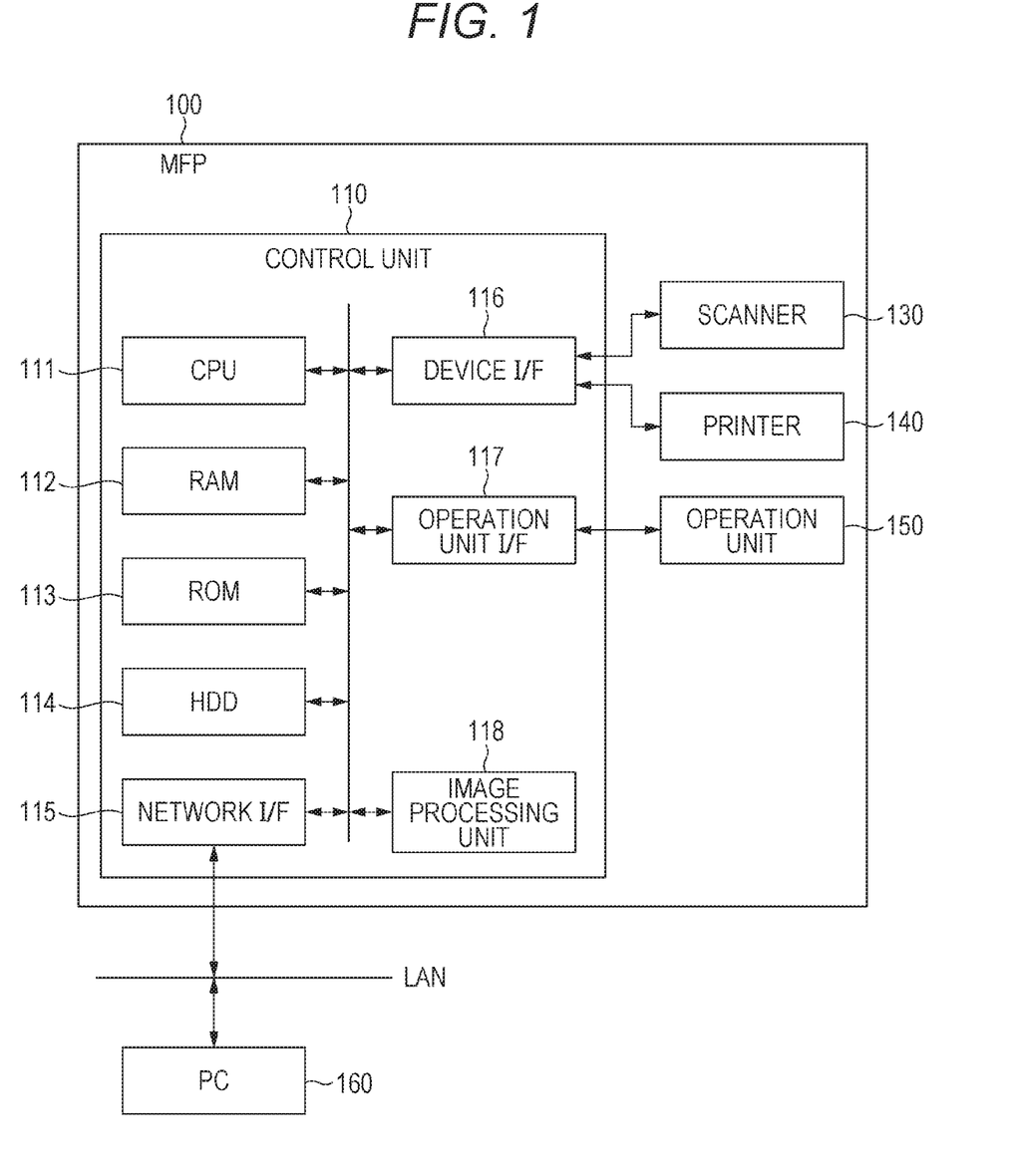
FIG. 1 is a block diagram illustrating a system configuration of an image forming apparatus.

FIG. 1 is a block diagram illustrating a configuration example of an image forming apparatus (MFP) according to an embodiment of the present disclosure.

An MFP 100 includes a control unit 110, a scanner 130, a printer 140, and an operation unit 150.

The control unit 110 is connected to the scanner 130 as an image input device and the printer as an image output device, and controls input and output of image information, The control unit 110 is connected to the operation unit 150 that accepts an operation by the user, and performs control based on an instruction from the user. The control unit 110 accepts a job or the like from an information processing apparatus such as a PC 160 via a LAN.

The control unit 110 includes a CPU 111, a RAN 112, a ROM 113, an HDD 114, a network I/F 115, a device I/F 116, an operation unit I/F 117, and an image processing unit 118.

The CPU 111 controls the operations of the MFP 100 by reading a program 300 from the ROM 113 to the RAM 112 and executing the program.

The ROM 113 stores the program 300 for controlling the operations of the MFP 100, The program 300 will be described later.

The RAM 112 is a memory for temporarily storing image data and the like to be processed by the image processing unit 118.

The HDD 114 is a hard disk in which programs, image data, and the like are stored, In the MFP 100, there is used a file system 500 in which, when accessing the HDD 114, image data stored in the HDD 114 can be handled as a file unit. The file system 500 will be described later.

The program stored in the HDD 114 is loaded into the RAM 112, and the CPU 111 controls the operations of the MFP 100 based on the program.

The network I/F 115 communicates with an external device such as the PC 160 over a network via the LAN to input and output various kinds of information. For example, the network OF 115 accepts a job.

The device I/F 116 connects the scanner 130 and the printer 140 as image input/output devices to the control unit 110 to perform synchronous/asynchronous conversions of image data.

The operation unit I/F 117 is an interface that connects the operation unit 150 and the control unit 110, and outputs image data to he displayed on the operation unit 150 to the operation unit 150. The operation unit I/F 117 transmits information input by the user from the operation unit 150 to the CPU 111.

The image processing unit 118 performs image processing on print data received via the LAN and image data input/output from the device I/F 116.

Figure 2:
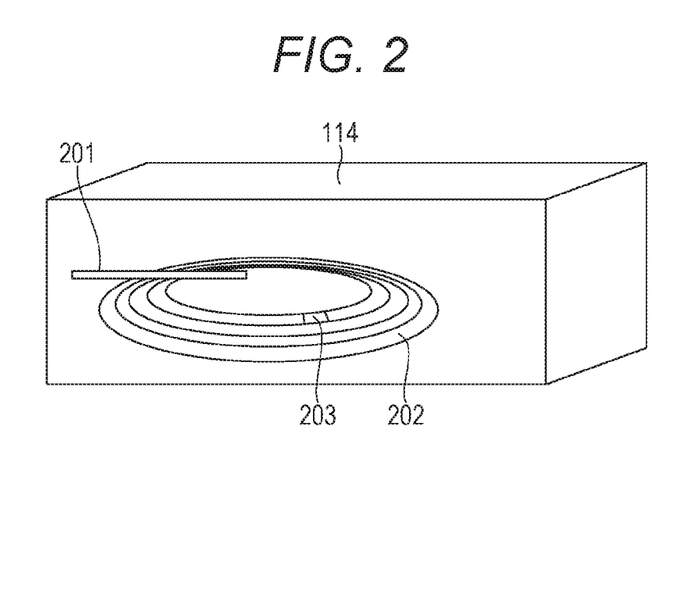
FIG. 2 is a diagram describing a schematic configuration of a hard disk.

Next, a schematic configuration of the HDD 114 will be described with reference to FIG. 2. The HDD 114 includes a magnetic head 201 and a magnetic disk 202.

The magnetic disk 202 is a storage medium for storing data, The magnetic disk 202 is divided into small areas called sectors 203, and data storage (writing) and reading are performed in units of the sectors 203.

The magnetic head 201 reads the magnetism from a magnetic body and supplies magnetism to a magnetic body. The magnetic head 201 scans the magnetic disk 202 as a magnetic body, reads the magnetism from the magnetic body, reads data, and stores the data by applying magnetism.

The sectors 203 are brought into an abnormal state when the position of the magnetic head 201 is shifted due to an external shock or depending on the environment of temperature and humidity to displace the sectors 203 to be read/written, or when writing to the sector 203 is not completed normally due to an unexpected shutdown during the writing. If the sectors go into an abnormal state, the specific data stored in the sectors in the abnormal state cannot be normally read. Then, a read error of the HDD 114 is detected.

Figure 3:
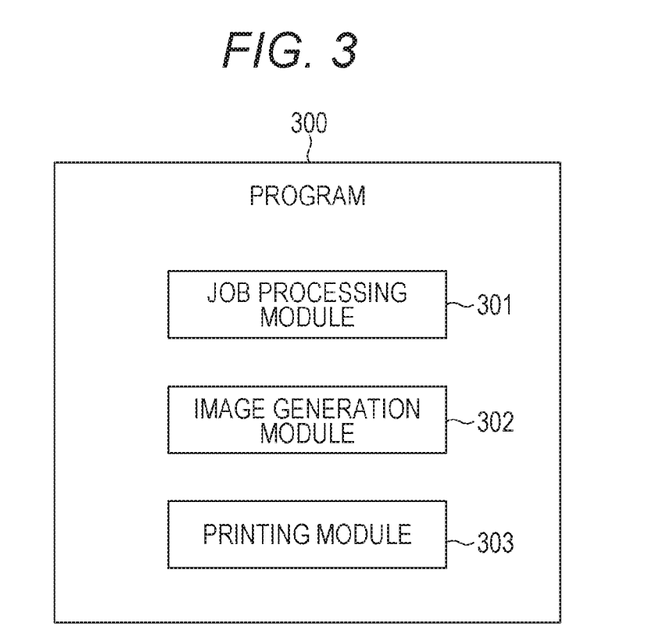
FIG. 3 is a block diagram illustrating a module configuration of a program for controlling operations of the image forming apparatus.

Next, the program 300 stored in the ROM 113 will be described with reference to FIG. 3. The program 300 includes a job processing module 301, an image generation module 302, and a printing module 303.

The image generation module 302 is a module that executes a job, generates image data, and stores the image data in the hard disk 114.

The printing module 303 is a module that reads image data stored in the hard disk 114 and performs an image forming process (print process) for forming an image from the read image data.

The job processing module 301 is a module that controls the image generation module 302 and the printing module 303 according to a job.

Figure 4:
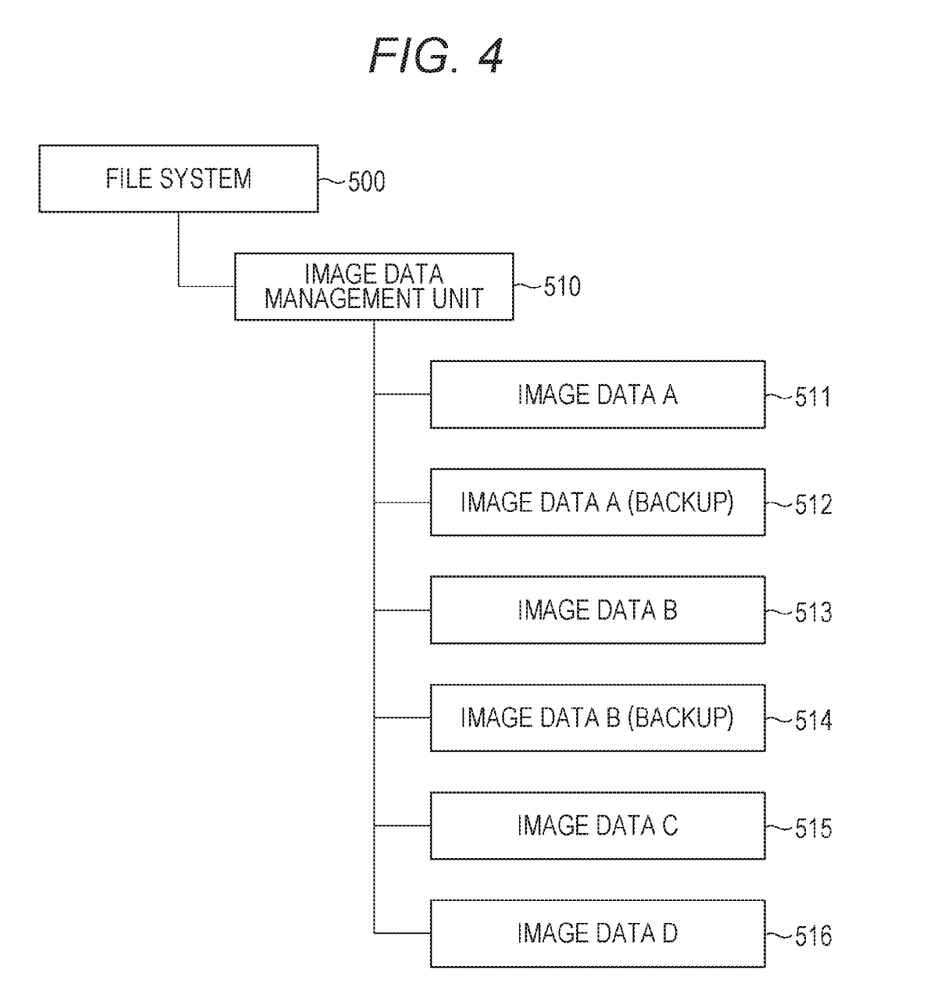
FIG. 4 is a block diagram illustrating a file system configuration on the hard disk of the image forming apparatus.

Next, a data management structure at the time of storing the image data generated by the image generation module 302 illustrated in FIG. 3 in the hard disk 114 will be described with reference to FIG. 4.

The file system 500 is illustrated such that each image data stored in the HDD 114 is represented in a file unit. Each of the files may be stored and managed in a folder classified according to a job type.

The file system 500 receives an instruction from an application in the file system. Depending on the content of the instruction, the file system can specify a file name with a file path and open a file, write a file, or read data in a file.

The file system 500 includes an image data management unit 510 that stores image files. The image data management unit 510 manages image data 511 to 516 in an image data management table (not illustrated).

In the present embodiment, image data A512 is stored as a copy (backup) of image data A511. In addition, image data B514 is stored as a copy (backup) of image data B513. The image data and the backup image data corresponding to the image data are identical image data. In this example, one backup image data is stored for one image data, but two or more units of backup image data may be stored.

In the case of a general file system, one file is stored in one sector 203. That is, when "image data" and "image data (backup)" are stored, they are stored in different sectors. Therefore, even when an abnormality occurs in the sector in which the "image data" is stored, the MFP 100 can acquire the desired image data by normally reading the "image data (backup)" stored in another sector.

Next, from the reception of a job to the end of image generation process will be described with reference to the flowchart illustrated in FIG. 5. Each step in this flowchart is implemented by reading a program from the ROM 113 into the RAM 112 and executing the read program by the CPU 111.

Figure 5:
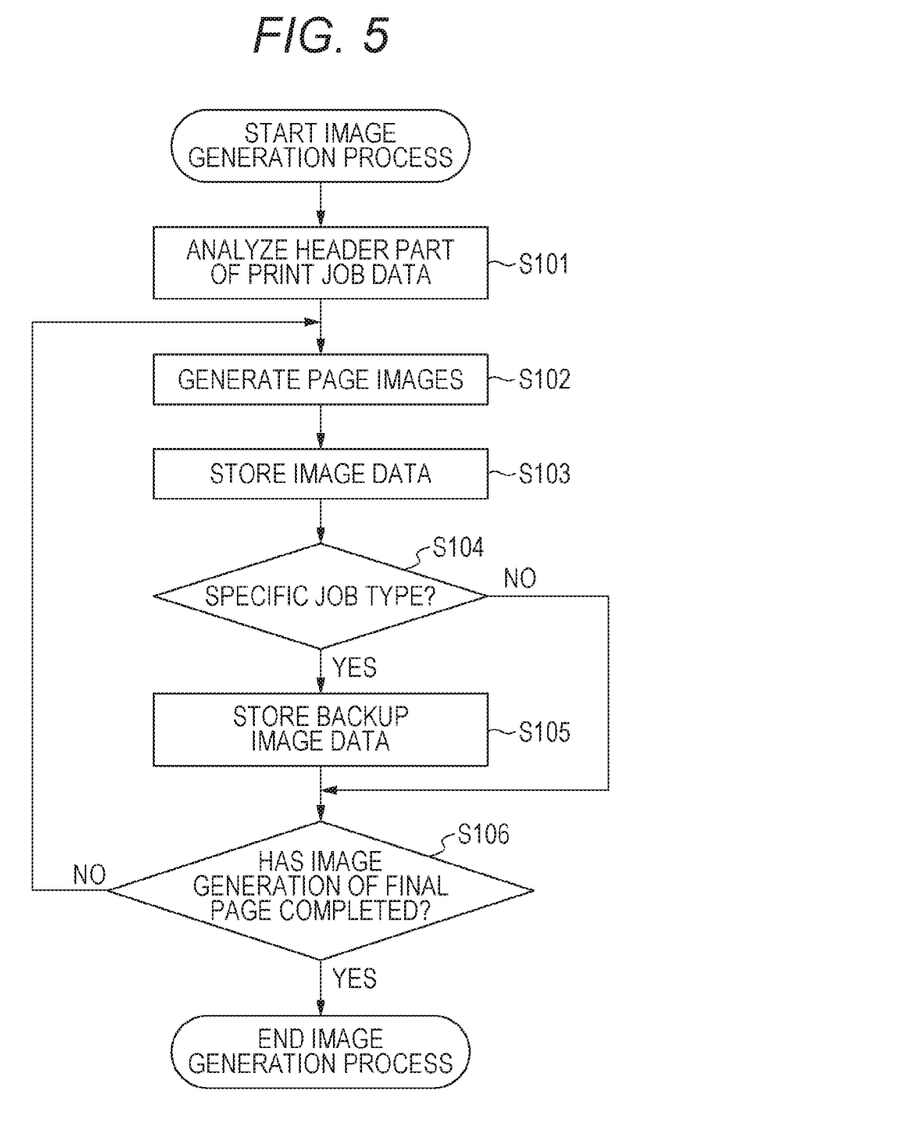
FIG. 5 is a flowchart describing a flow of an image generation process by the image forming apparatus.

The process in the flowchart of FIG. 5 starts when the MFP 100 accepts a job. Upon acceptance of the job, the MFP 100 generates a management table 700 illustrated in FIG. 6.

Figure 6:
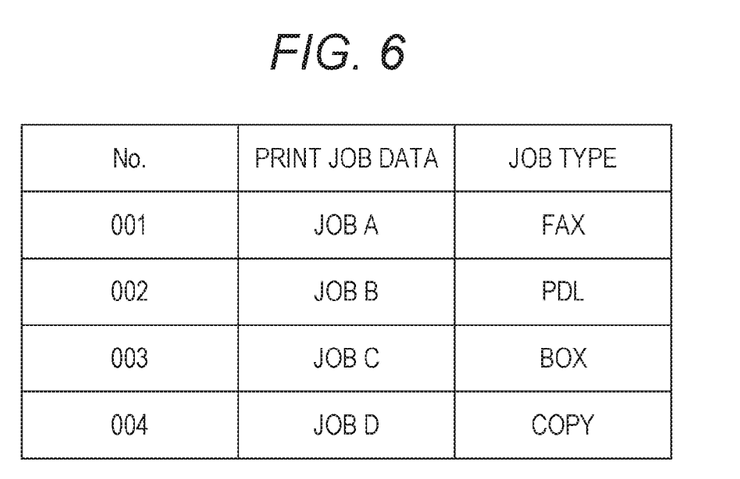
FIG. 6 is a diagram illustrating an example of job management table.

FIG. 6 illustrates the management table of job data managed by the job processing module 301. The management table saves at least job data and job types in association with each other.

The job type is determined by a job data input unit. For example, the job type of a job accepted by the scanner 130 reading an original upon receipt of a copy instruction from the operation unit 150 is determined as COPY job. The job type of a job accepted by receiving PM, data from the PC 160 via the network is determined as a PDL job.

The job type of a job accepted by receiving facsimile data from a telephone line (not illustrated) and storing the received facsimile data in the HDD 114 is determined as a FAX job (FAX memory reception job). A COPY job or PDL job set to be stored (held) in the HDD 114 without executing the job is determined as a BOX job. The BOX job is executed by receiving an execution instruction of the job stored in the HDD 114 from the operation unit 150.

Figure 7:
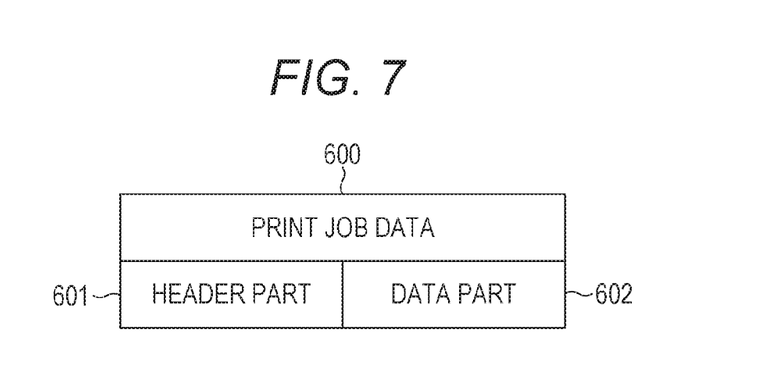
FIG. 7 is a block diagram illustrating a configuration of job data transmitted to the image forming apparatus.

In step S101, the CPU 111 analyzes job data 600 of a received job stored in the RAM 112. The job data 600 includes a header part 601 and a data part 602, as illustrated in FIG. 7. The header part 601 includes print settings (for example, color/monochrome) and the like, and the data part 602 includes data as a basis of image data. In addition, the header part 601 also stores information indicating a job type. Therefore, the job type of a job may be set by analyzing the header part 601.

The description will return to FIG. 5. In the analysis of the job data in step S101, specifically, the header part 601 of the job data 600 is analyzed to acquire the setting value (for example, color/monochrome, number of copies, etc.) of the job. When step S101 is completed, the process proceeds to step S102.

In step S102, the CPU 111 processes the data part 602 of the job data 600 by the image generation module 302 and causes the RAM 112 to hold the generated image data.

In step S103, the CPU 111 causes the HDD 114 to store the image data generated in step S102. The image data stored in the HDD 114 is managed by the image data management unit 510. When step S103 is completed, the process proceeds to step S104.

Figure 8A:
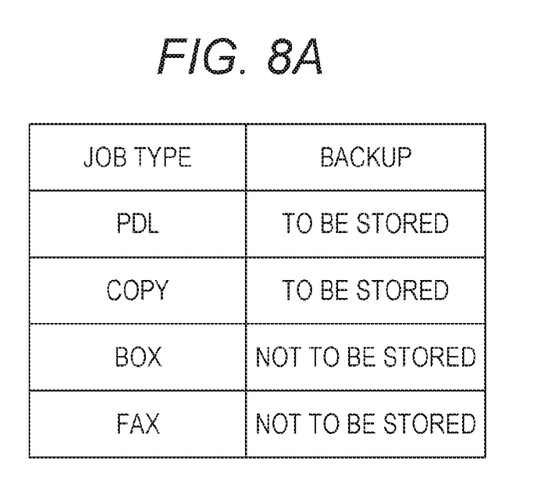
FIGS. 8A and 8B are tables illustrating the presence or absence of backup image data for each job type.

In step S104, the job type of the job to be executed is checked from the association of the job data and the job type illustrated in FIG. 6. It is determined based on FIG. 8A whether or not the job type of the job is a predetermined specific job type (job type of which backup image data is to be stored). FIG. 8A will be here described.

FIG. 8A is a table illustrating the setting of whether or not each job type is a specific job type (whether or not it is a job type for storing backup image data).

The image forming apparatus according to the present example is set such that the type of a job not to be stored in the HDD 114 for a long period of time is the specific job type (backup image data is stored). The image forming apparatus according to the present example is set such that the type of a job to be stored in the HDD 114 for a long period of time is not the specific job type (backup image data is not stored). This is because if backup image data is stored for image data to be stored for a long period of time, the capacity of the HDD 114 may be greatly consumed.

Next, these settings will be specifically described. For a page description language (PDL) job 801 and a COPY job 802, the data in the HDD 114 is deleted after printing is completed. Thus, the image data is not stored in the HDD 114 for a long period of time, and the capacity of the HDD 114 is not greatly consumed. Therefore, the PDL job 801 and the COPY job 802 are set to the job types of which the backup image data is to be stored.

On the other hand, a BOX job 803 relates to a storage function to store image data in the HDD 114 and using the same for printing, e-mail transmission, etc. at an arbitrary timing. Therefore, the image data is stored in the HDD 114 unless the user executes the job or deletes the image data.

Similarly, a FAX job 804 relates to a function to store the image data in the HDD 114 and hold the image data even after the power-off/on of the device. Therefore, the image data is stored in the HDD 114 unless the user executes the job or deletes the image data.

Therefore, for the BOX job 803 and the FAX job 804, the image data is stored in the HDD 114 for a long period of time to greatly consume the capacity of the HDD 114. Therefore, the BOX job 803 and the FAX job 804 are set to the job types of which the backup image data is not to be stored.

According to the settings of the present example, it is possible to suppress a printing error due to a reading error while suppressing an increase in the capacity of the hard disk. Note that backup means storing a plurality of units of identical image data.

The description will return to FIG. 5. When the job type of the job is the specific job type, the process proceeds to step S105. In step S105, the CPU 111 further stores the image data held in the RAM 112 in the HDD 114. The image data stored here is backup image data copied from the image data stored in the HDD 114 in step S103, and they are substantially identical image data. As described above, the backup image data may be one or plural, When step S105 is completed, the process proceeds to step S106.

On the other hand, when it is not determined in step S104 that the identified job type of the job is the specific job type, the process proceeds to step S106.

In step S106, the CPU 111 determines whether or not the processing has completed up to the final page of the job data. When the processing has not completed up to the final page of the job data, the process returns to step S102 and the image generation process is terminated.

Next, from the start to end of the image forming process will be described with reference to the flowchart illustrated in FIG. 9. Each step in this flowchart is implemented by reading a program from the ROM 113 into the RAM 112 and executing the read program by the CPU 111.

Figure 9:
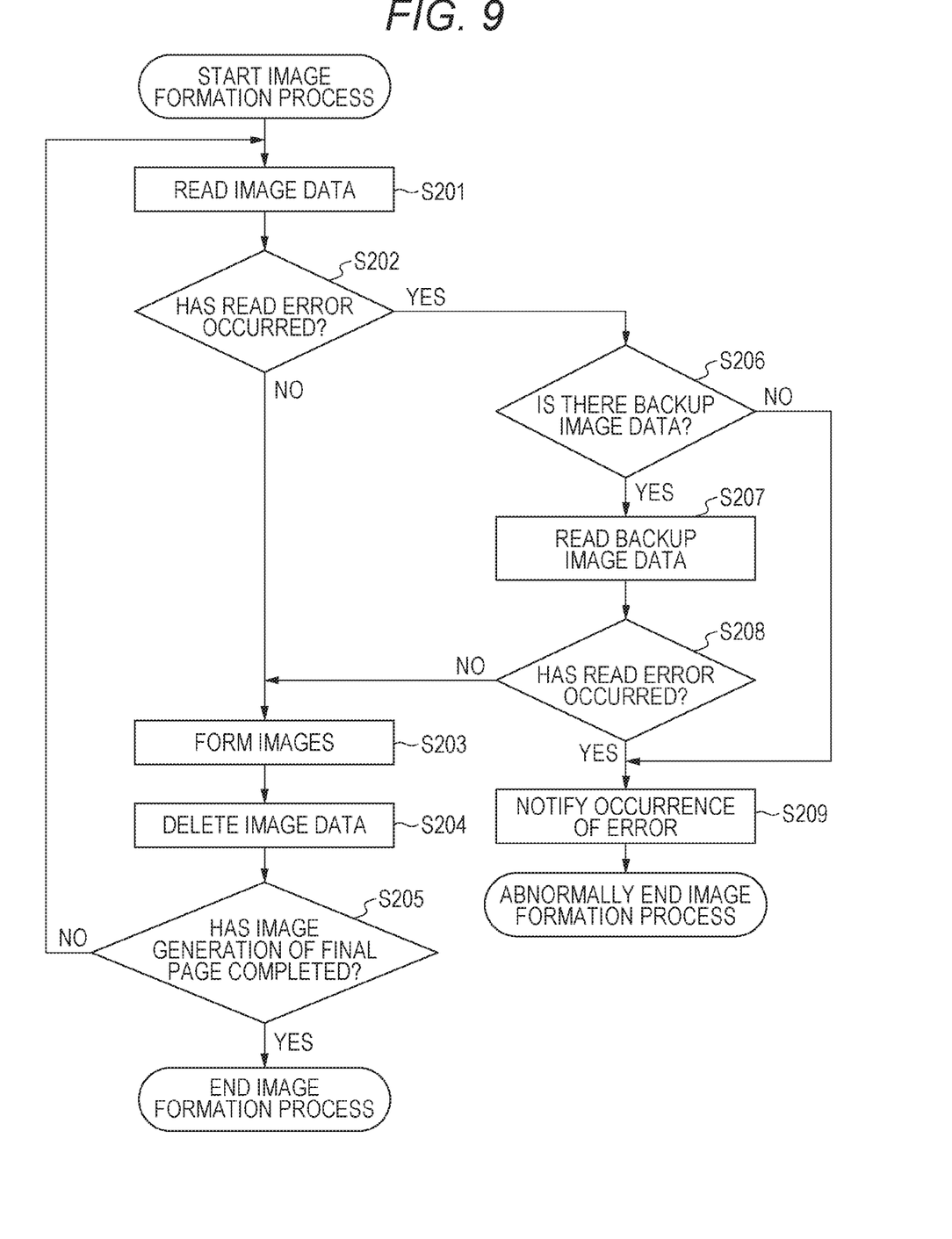
FIG. 9 is a flowchart describing a flow of the image forming process by the image forming apparatus.

The process in the flowchart of FIG. 9 starts on executing a job. In step S201, the image data stored in the HDD 114 is read out to the RAM 112 (reading processing). When step S201 is completed, the process proceeds to step S202.

In step S202, it is determined whether or not a read error has occurred in the read processing in step S201. When no read error has occurred, the process proceeds to step S203.

In step S203, the image forming apparatus 100 performs an image forming process. In the image forming process, image data read from the HDD 114 is stored in a storage medium by electrophotography, for example. Specifically, the CPU 111 transmits the image data read from the HDD 114 to the printer 140 via the device I/F 116. The printer 140 forms a toner image on a photosensitive drum (not illustrated) based on the received image data, transfers the toner image to a sheet, and forms an image on the sheet. The image forming process may he performed by other means limited to electrophotographic technology. When step S203 is completed, the process proceeds to step S204.

In step S204, the image data of which the image formation has been performed in step S203 is deleted from the hard disk 114. In addition, the job processing module 301 deletes the image data of which the image formation has been performed in step S203 from the management table 700 illustrated in FIG. 6. Note that the deletion processing here is not essential in the present embodiment, and the image data may be left for reuse.

In step S205, it is determined whether it is the final page of the job for the image formation. When it is not the final page, the process returns to step S201, When it is the final page, this flowchart is ended.

The description will return to step S202. When it is determined in step S202 that a read error has occurred in the HDD 114, the process proceeds to step S206. The read error of the HDD 114 is an example of read processing failure in the file system, and the read processing failure occurs in the reading from the defective sector.

In step S206, the CPU 111 determines whether or not a backup of the image data in which the read error has occurred exists in the HDD 114. If there is the backup, the process proceeds to step S207.

In step S207, the CPU 111 performs read processing of the backup image data determined in step S207.

When it is not determined in step S208 that any error has occurred in the read processing of the backup image data subjected to the read processing in step S207, the process proceeds to step S203.

When it is determined in step S208 that an error has occurred in the read processing of the backup image data subjected to the read processing in step S207, the process proceeds to step S209.

The description will return to step S206. In step S206, the CPU 111 determines whether or not a backup of the image data in which the read error has occurred exists in the HDD 114. If there is no backup, the process proceeds to step S209.

Figure 10A:
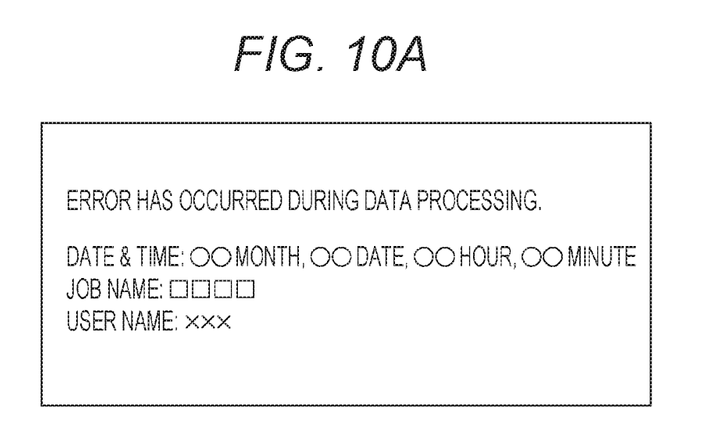
FIGS. 10A and 10B are diagrams illustrating a display example in the event of an error.

In step S209, the CPU 111 notifies that the read error of the image data from the hard disk 114 has occurred. In this example, the screen of FIG. 10A is displayed on the operation unit 150. Referring to FIG. 10A, a message indicating that an error has occurred, the date and time, the job name, the user name, and the like are displayed to the user. When step S209 is terminated, the CPU 111 subjects the image forming process to abnormal termination.

As described above, according to the present example, it is possible to suppress an increase in the capacity of the hard disk while suppressing a read error of image data.

In the present example described above, backup image data of a specific job type is stored. Alternatively, after generated image data of a specific job type is stored from the RAM 112 to the HDD 114, verification processing as read processing for confirmation may be performed. In such a configuration as well, it is possible to suppress a printing error resulting from a reading error of the HDD 114. Furthermore, it is possible to shorten the write and read processing time of the HDD than in the case of performing the verification processing on all the jobs.

In the present example described above, backup image data of a specific job type is stored, and image data of the other job types is normally stored from RAM 112 to HDD 114 without storing backup image data. Alternatively, backup image data of a specific job type may be stored, and image data of the other job types may be subjected to verification processing. According to this configuration, it is possible to further suppress a printing error due to a reading error while suppressing an increase in the capacity of the hard disk.

Second Example

In the first embodiment, in step S104, the job type of a job not to be stored in the HDD 114 for a long period of time is set as a job type for storing backup image data, and the job type of a job to be stored in the HDD 114 for a long period of time is set as a job type not for storing backup image data.

Figure 10B:
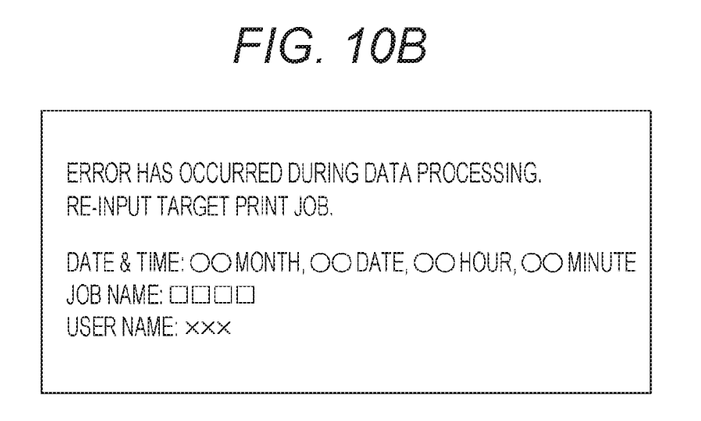

However, the present example is different from the first example in that, in step S104 illustrated in FIG. 5, the job type of a job difficult to re-input is set as a job type for storing backup image data, and the job type of a job easy to re-input is set as a job type not for storing backup image data. In the present example, the error screen displayed in step S209 illustrated in FIG. 9 may be made different. Specifically, a display for prompting re-input of a job may be displayed as illustrated in FIG. 10B.

In the present embodiment, components having the same functions as those illustrated in FIGS. 1 to 10 will be given the same reference numerals, and detailed description thereof will be omitted.

In step S104 illustrated in FIG. 5, the type of a job to be executed is identified from the association between job data and job type illustrated in FIG. 6. When the identified job type of the job is a specific job type, the process proceeds to step S105.

Figure 8B:
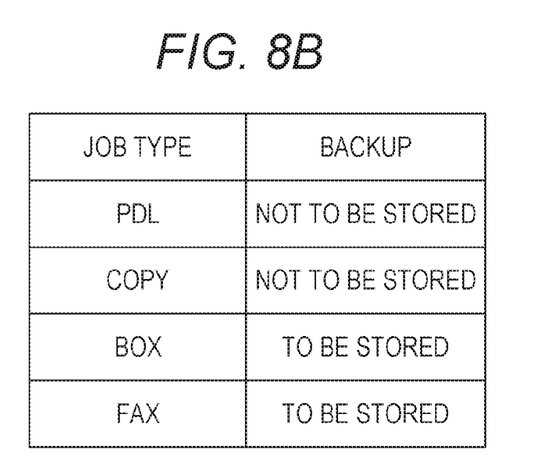

It is determined based on FIG. 8B whether or not the checked type of the job is a predetermined specific job. Hereinafter, descriptions will be given with reference to FIG. 8B.

FIG. 8B is a table illustrating the setting of whether or not each job type is a specific job type (whether or not it is a job type for storing backup image data).

In the image forming apparatus of the present embodiment, the job type in which re-input of a job is not easy is set as a specific job type, and the job type in which re-input of a job is easy is not set as a specific job type.

This is to save a backup for the job type in which re-input of a job is not easy so that the job can be reliably executed. On the other hand, no backup image data is stored for the job type in which re-input of a job is easy so that the capacity of the HDD 114 is not greatly consumed.

In the case of the PDL job 805, no backup image data is stored. This is because the user who inputs the job is identical to the user who obtains the printed product, and it is thus easy to re-input the job.

In the case of the COPY job 806, no backup image data is stored. This is because the job is inputted from the scanner 130, and it is thus easy to re-input the job.

In the case of the BOX job 807, backup image data is stored. This is because the timing of storing in the HDD 114 and the timing of printing are often different, and it may be thus difficult to re-input the job.

In the case of the FAX job 808, backup image data is stored. This is because the user who inputs the job and the user who obtains the printed product are different from each other in the FAX job, and it may he thus difficult to re-input the job.

As described above, according to the configuration of the present example as well, it is possible to suppress an increase in the capacity of the hard disk while suppressing a read error of image data.

Modification

Next, a modification will be described. In the example, backup image data is stored for all jobs. Then, reading processing (verification processing) for confirmation is performed on the job of the job type to be stored in the hard disk for a long period of time. When the read processing for confirmation has succeeded, the backup image data is deleted. The present modification describes a modification of the first example but may be applied to the second example.

Figure 11:
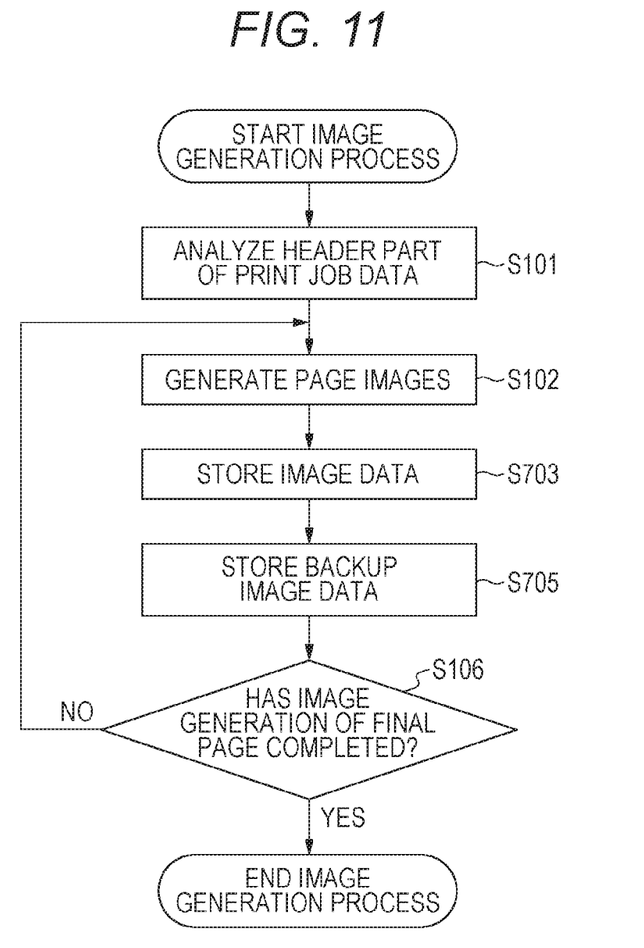
FIG. 11 is a flowchart describing a flow of an image generation process by the image forming apparatus.

From the reception of a job to the end of an image generation process will be described with reference to the flowchart illustrated in FIG. 11. FIG. 11 corresponds to FIG. 5 and the components having the same functions as those illustrated in FIG. 5 will be given the same reference numerals, and detailed description thereof will be omitted.

In step S703, the CPU 111 causes the HDD 114 to store the image data generated in step S102. The image data stored in the HDD 114 is managed by the image data management unit 510. When step S703 is completed, the process proceeds to step S705.

In step S705, the CPU 111 farther stores the image data held in the RAM 112 in the HDD 114. The image data stored here is image data copied for backup from the image data stored in the HDD 114 in step S703, which are substantially the same image data. As described above, the backup image data may be one or plural. When step S705 is completed, the process proceeds to step S106.

In step S106, the CPU 111 determines whether or not the processing has completed up to the final page of the job data. When the processing has not completed up to the final page of the job data, the process returns to step S102. When the processing has completed, the image generation process is terminated.

Next, an image data checking process of the present modification will be described with reference to the flowchart illustrated in FIG. 12. Each step in this flowchart is implemented by reading a program from the ROM 113 into the RAM 112 and executing the read program by the CPU 111.

Figure 12:
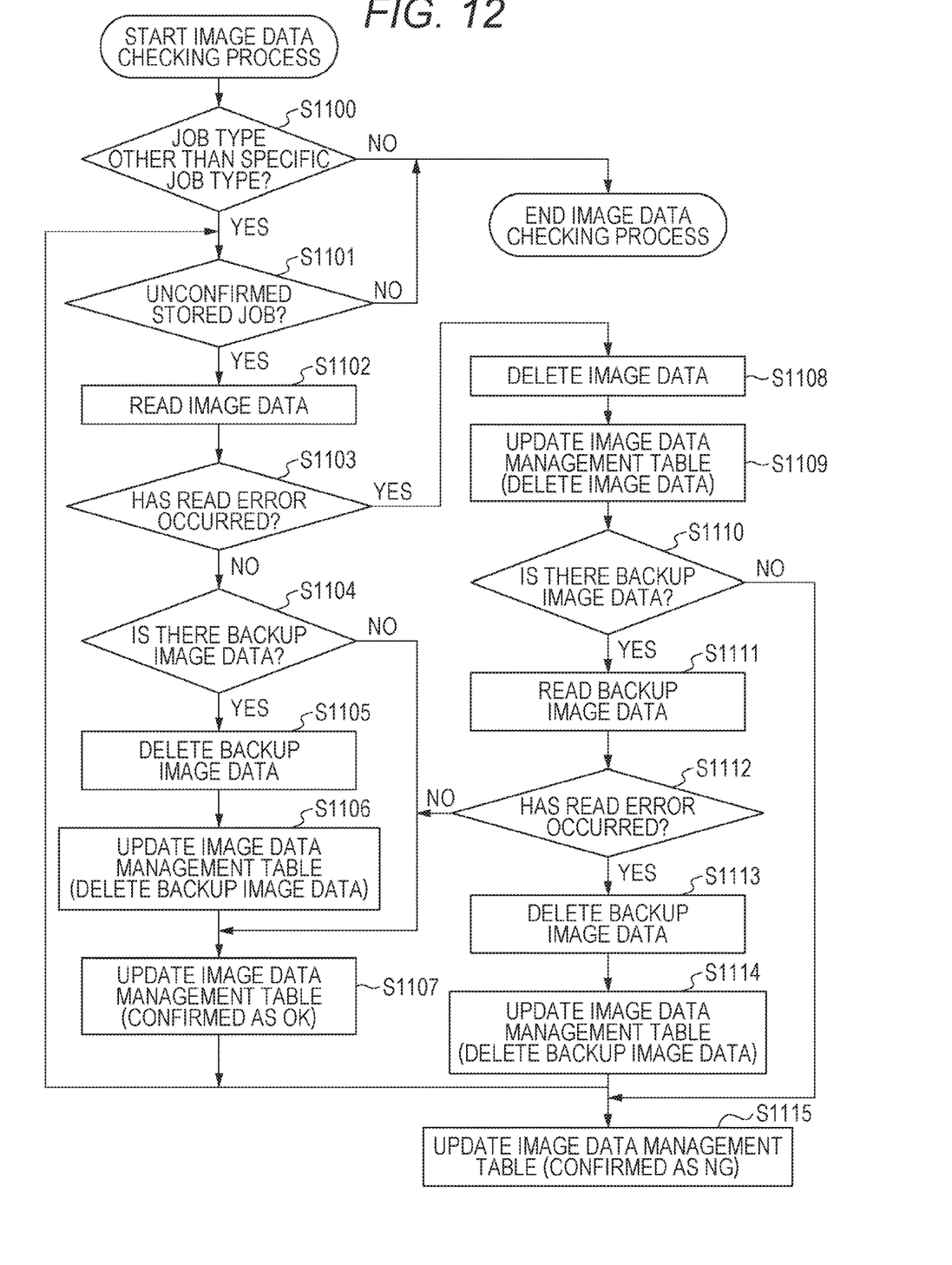
FIG. 12 is a flowchart describing a flow of the image forming process by the image forming apparatus.

The image data checking process illustrated in FIG. 12 is started by a predetermined method. The predetermined method includes, for example, starting the processing by terminating the image generation process, periodically executing the processing with a timer, and starting the processing by storing image data in a job other than a specific job in the HDD 114.

In step S1100, the type of job is checked. It is determined based on FIG. 8A whether or not the checked type of the job is a predetermined specific job (job for storing backup image data). The type of the job is checked from the association of job data and job type illustrated in FIG. 6 for the jobs illustrated in FIG. 12. When the image data management unit 510 illustrated in FIG. 4 forms respective folders for the job types, the image data management unit 510 may check whether a file is stored in each of the folders.

When the job is a job other than a predetermined specific job, the process proceeds to step S1101. When the job is a specific job, the process is terminated.

Hereinafter, a case where jobs other than a specific job are a BOX job and a FAX job (the first example) will be described below. In this case, a plurality of BOX jobs is stored in the image data management table illustrated in FIG. 13 as an example. The image data management table 1000 is data stored in the HDD 114. However, the image data management table 1000 may be stored in another non-volatile device.

Figure 13:
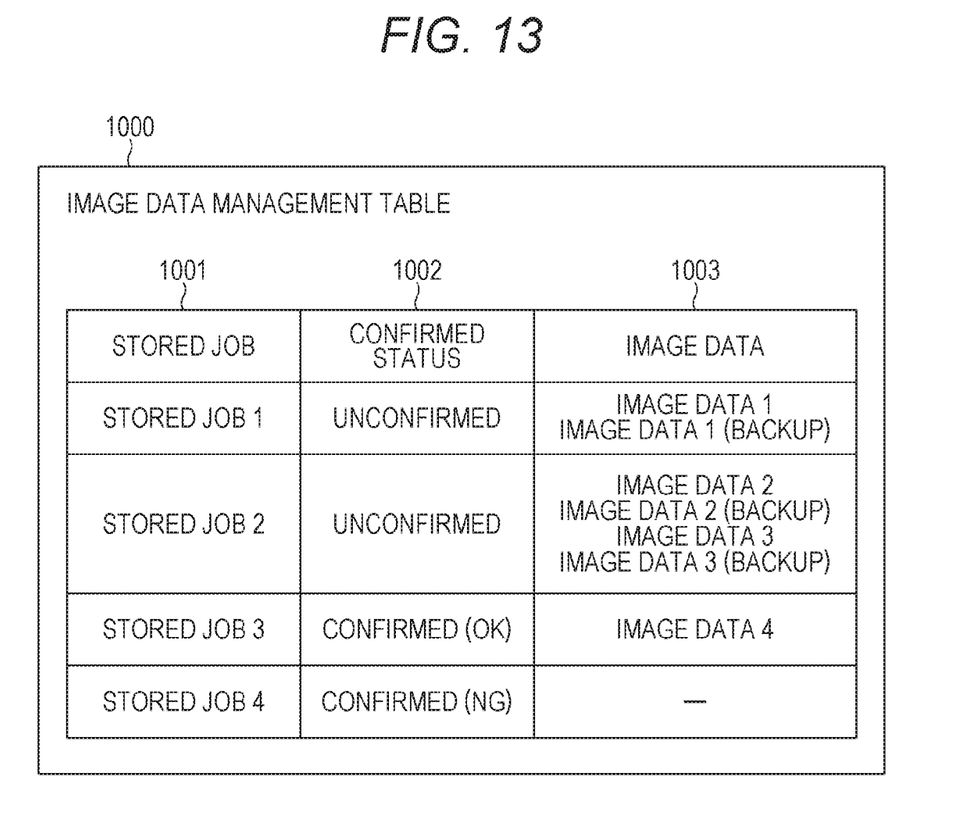
FIG. 13 is a diagram illustrating an image data management table.

FIG. 13 will be described FIG. 13 is a diagram illustrating a management method of image data by the image data management unit 510. The image data management unit 510 manages image data of each job using the image data management table 1000.

The image data management table 1000 is composed of combinations of jobs 1001 and image data 1003 stored in the HDD 114, and one job is composed of one or more units of image data. Information of the image data 1003 is information to be registered when the image data is stored in step S703 and step S705.

In the example of FIG. 13, jobs A to D are stored, and the information of the image data constituting these jobs is described. The jobs are of the job types illustrated in FIG. 6.

Each of the jobs has the information of confirmation status 1002, and when the read confirmation of the image data constituting the job is completed, the status is updated to "confirmed".

The status includes "unconfirmed" or "confirmed", and the confirmed status includes two results of OK and NG.

The result of OK indicates that either the image data or the paired image data (backup) is determined to be normal in the read confirmation processing, and the result of NG indicates that both the image data and the paired image data (backup) are determined to be abnormal.

Since the image data determined to be abnormal will be deleted as described later, there may be a state in which no image data for the job determined to be NG is stored in the image data management table 1000.

The description will return to FIG. 12. In step S1101, the image data management unit 510 refers to the image data management table 1000 illustrated in FIG. 13 and checks whether there is a BOX job of which the confirmation status 1002 is unconfirmed. When there exists such a BOX job, the process proceeds to step S1102, and when there exists no BOX job, the process is terminated.

In step S1102, the CPU 111 reads the image data managed by the image data management unit 510 from the hard disk 114 and executes read processing. In step S1103, the CPU 111 determines whether an error has occurred in the read processing in step S1102. When there is no error, the process proceeds to step S1104. When there is an error, the process proceeds to step S1108. The error is an example of read processing failure in the file system, and the read processing failure occurs in the reading from the defective sector.

In step S1104, the CPU 111 determines whether there exists a backup of the image data with the error, When there exists a backup, the process proceeds to step S1105, and when there exists no backup, the process proceeds to step S1107.

In step S1105, the backup image data is deleted, This processing is performed because, since there is image data that has been successfully read out in step S1103, it has been determined that the backup image data is unnecessary. Therefore, deleting the unnecessary data suppresses an increase in the capacity of the hard disk.

In step S1106, the information of the backup image data deleted in step S1105 is deleted from the image data 1003 of the image data management table 1000.

In step S1107, the confirmation status 1002 of the image data management table 1000 is updated to "confirmed (OK)". When step S1107 is completed, the process returns to step S1101.

On the other hand, in step S1108 which is performed when there is a read error in step S1103, the image data with the read error is deleted.

In step S1109, the information of the image data deleted in step S1108 is deleted from the image data 1003 of the image data management table 1000.

In step S1110, it is determined whether there is a backup of the image data deleted in step S1108. When there exists a backup, the process proceeds to step S1111, and when there exists no backup, the process proceeds to step S1115.

In step S1111, the backup image data stored by the image data management unit 510 is read out from the hard disk 114 and executes read processing. In step S1112, it is determined whether an error has occurred in the read processing in step S1111.

When there is no error, the process proceeds to step S1107. When there is an error, the process proceeds to step S1113. The error is an example of read processing failure in the file system, and the read processing failure occurs in the reading from the defective sector.

In step S1113, the backup image data is deleted. This suppresses an increase in the capacity of the hard disk.

In step S1114, the information of the backup image data deleted in step S1113 is deleted from the image data 1003 of the image data management table 1000.

In step S1115, the confirmation status 1002 of the image data management table 1000 is updated to "confirmed (NG)". When the confirmation status 1002 is updated to "confirmed (NG)", a screen as illustrated in FIG. 14 is displayed on the operation unit, for example.

Figure 14:
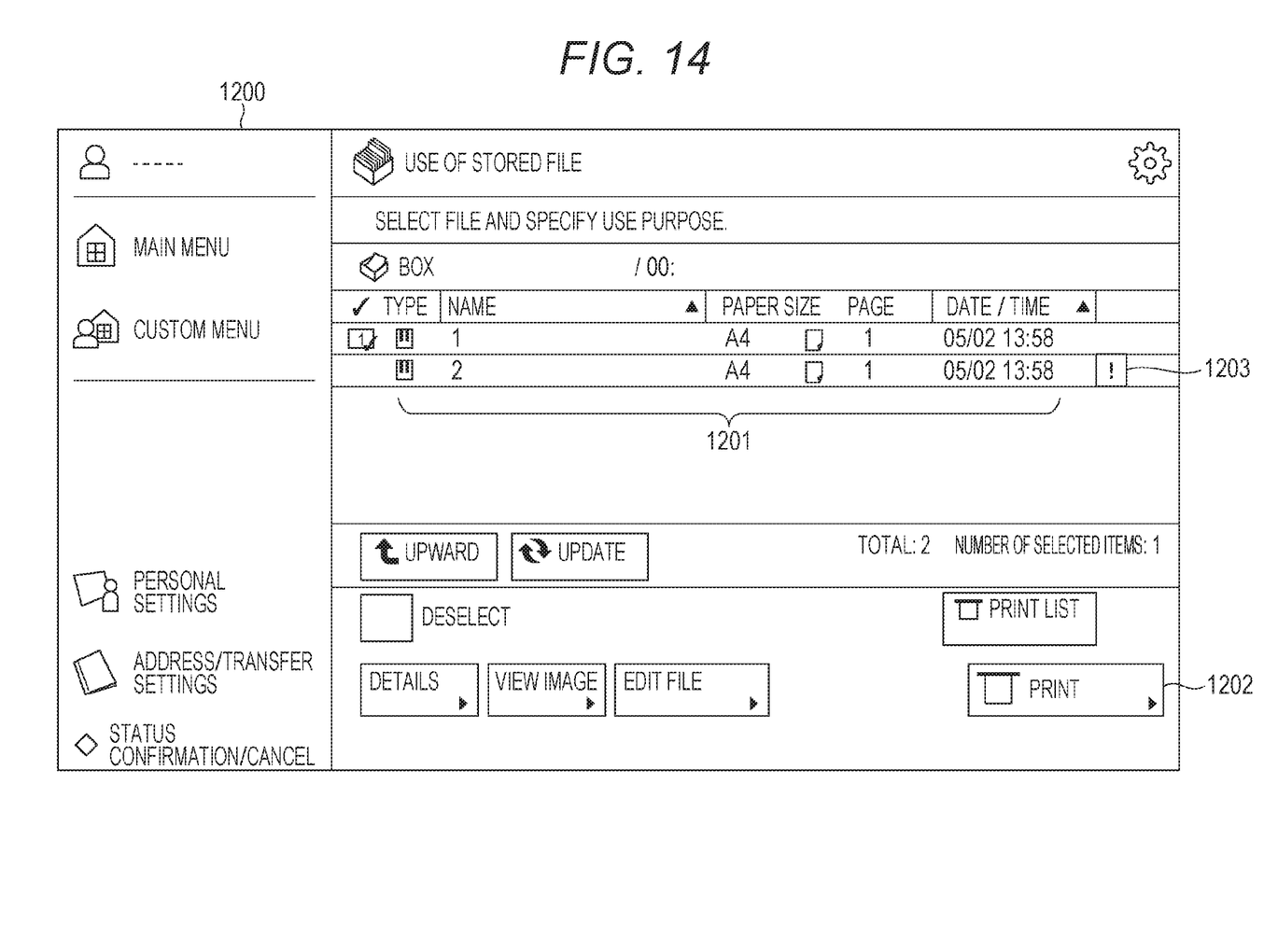
FIG. 14 illustrates a display example of data error of saved job.

FIG. 14 is a diagram illustrating an example of an operation screen for saved jobs in the BOX. A BOX saved job display screen 1200 displays information of the saved jobs. In FIG. 14, each of the jobs can be executed by selecting the job and pressing a print button 1202. The execution of the job starts the image forming process in the flowchart of FIG. 9.

When the confirmation status 1002 is updated to "confirmed (NG)", an icon 1203 representing a data abnormality is displayed. Adding a highlight to the "confirmed (NG)"job as described above makes it possible to notify the user of the data abnormality. Although the icon is used here for highlight, any other expression may be used such as changing the display color of the job. Descriptions of other buttons not directly related to the present disclosure will be omitted.

The description will return to FIG. 13, When step S1115 is completed, the process returns to step S1101 to check whether there is an unconfirmed saved job of the specific job type. When there is no unconfirmed job, the process is terminated. In this example, the image data confirmation process is performed for all the BOX jobs. However, the image data confirmation process may not be performed for some of the jobs.

As described above, in the present modification as well, it is possible to suppress an increase in the capacity of the hard disk while suppressing a read error by switching the method of storing the image data in the hard disk according to the job type of the image data.

In the present modification, job types other than the specific job type are BOX job and FAX job, but may be PDL job or COPY job. In that case, when the image generation process is completed, the image data checking process is started. When step S1101 is eliminated and it is determined in step S1100 that there is a job type other than the specific job type, the process proceeds to step S1102 to read out image data. In addition, when steps S1106 and S1114 are completed, the image data checking process is terminated.

In addition, the image data checking process is performed on jobs of job types other than the specific job type in the present modification. Alternatively, the image data checking process may be performed on all jobs. In that case, S1100 is eliminated.

Even in this configuration, it is possible to suppress an increase in the capacity of the hard disk while suppressing an read error by switching the method for storing in the hard disk.

Other Embodiments

The various examples and embodiments of the present disclosure have been described so far. However, the spirit and scope of the present disclosure are not limited to the specific descriptions therein. Embodiments of the present disclosure can be carried out by supplying a program for implementing one or more functions of the embodiments described above to a system or apparatus via a network or storage medium, and reading and executing the program by one or more processors in a computer of the system or apparatus. In addition, embodiments of the present disclosure can be carried out by a circuit (for example, an ASIC) that implements one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-109866, filed Jun. 7, 2018, which is hereby incorporated by reference herein in its entirety.

What is claimed is:

1. An image forming apparatus comprising:
a nonvolatile storage configured to store data based on a job; and
a controller configured to, based on receiving a first job whose type is a first job type, cause the nonvolatile storage to store first data included in the first job and not to store data identical to the first data, and, based on receiving a second job whose type is a second job type, cause the nonvolatile storage to store second data included in the second job and store data identical to the second data,
wherein, in a state in which both the second data and the data identical to the second data are stored in the nonvolatile storage, based on occurrence of a read error of the second data stored in the nonvolatile storage, the controller executes reading the data identical to the second data.

2. The image forming apparatus according to claim 1, wherein
when the nonvolatile storage detects the read error of the second data, the controller determines whether or not the data identical to the second data is stored in the nonvolatile storage, and
when determining that image data identical to the second data is stored in the nonvolatile storage, the controller causes the nonvolatile storage to read the data identical to the second data.

3. The image forming apparatus according to claim 2, further comprising:
a display,
wherein when the controller determines that the data identical to the second data is not stored in the nonvolatile storage, the display indicates that the read error has been detected.

4. The image forming apparatus according to claim 3, wherein, when the nonvolatile storage detects occurrence of a read error of the data identical to the second data, the display indicates that the read error has been detected.

5. The image forming apparatus according to claim 1, wherein the controller checks a job type of the job.

6. The image forming apparatus according to claim 1, further comprising:
an operation I/F configured to accept a job by accepting a copy instruction,
wherein the second job is a COPY job of printing data based on the job accepted by accepting the copy instruction.

7. The image forming apparatus according to claim 1, wherein the first job is a FAX job of accepting facsimile data via a telephone line.

8. The image forming apparatus according to claim 1, further comprising:
an operation I/F configured to accept a job by accepting a copy instruction,
wherein when the first job is either a PDL job of printing data based on the job accepted from the external device or a COPY job of printing data based on the job accepted by accepting the copy instruction.

9. The image forming apparatus according to claim 8, wherein the second job is either a FAX job of accepting facsimile data via a telephone line or a job to be used for printing or e-mail transmission at an arbitrary timing.

10. The image forming apparatus according to claim 1, further comprising:
a network interface (I/F) configured to receive a job from an external device,
wherein the second job includes a page description language (PDL) job to print data based on the job received from the external device via the network I/F.

11. The image forming apparatus according to claim 1, further comprising:
a printer configured to perform print processing of printing image data on a print target medium,
wherein the first job is a job of not performing the print processing by the printer based on receiving a job, and
wherein the second job is a job of performing the print processing by the printer based on receiving a job.

12. The image forming apparatus according to claim 1, further comprising:
a printer configured to perform print processing of printing image data on a print target medium,
wherein the first job is a job of performing the print processing by the printer based on receiving a job, and
wherein the second job is a job of not performing the print processing by the printer based on receiving a job.

13. The image forming apparatus according to claim 1, wherein the first job includes a setting of storing the first job in the nonvolatile storage.

14. The image forming apparatus according to claim 1, further comprising:
a printer configured to perform print processing of printing image data on a print target medium,
wherein the first data is printing data, and
wherein the controller, based on receiving the first job, does not execute print processing of the first job, causes the nonvolatile storage to store the first data according to a setting of storing the first job in the nonvolatile storage and does not store data identical to the first data.

15. The image forming apparatus according to claim 1, further comprising:
an operation unit configured to accept an operation,
wherein the controller executes reading of the first data based on receiving an instruction from the operation unit.

16. The image forming apparatus according to claim 15, wherein the controller executes e-mail transmission using the read first data.

17. A control method of an image forming apparatus having a nonvolatile storage configured to store data based on a job, the control method comprising:
based on receiving a first job whose type is a first job type, causing the nonvolatile storage to store first data included in the first job and not to store data identical to the first data, and, based on receiving a second job whose type is a second job type, causing the nonvolatile storage to store second data included in the second job and store data identical to the second data; and
in a state in which both the second data and the data identical to the second data are stored in the nonvolatile storage, executing reading the data identical to the second data based on occurrence of a read error of the second data stored in the nonvolatile storage.

* * * * *